United States Patent
Gorti et al.

(10) Patent No.: US 9,300,810 B2
(45) Date of Patent: Mar. 29, 2016

(54) METHODS AND APPARATUS TO MANAGE CONFERENCE CALLS

(71) Applicant: AT&T Intellectual Property I, L.P., Atlanta, GA (US)

(72) Inventors: Sreenivasa Gorti, Austin, TX (US); Hisao Chang, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/669,719

(22) Filed: Mar. 26, 2015

(65) Prior Publication Data

US 2015/0201084 A1 Jul. 16, 2015

Related U.S. Application Data

(63) Continuation of application No. 13/780,816, filed on Feb. 28, 2013, now Pat. No. 9,019,868, which is a continuation of application No. 12/039,575, filed on Feb. 28, 2008, now Pat. No. 8,411,835.

(51) Int. Cl.
| | |
|---|---|
| *H04L 12/16* | (2006.01) |
| *H04M 3/56* | (2006.01) |
| *H04M 3/42* | (2006.01) |
| *H04L 29/06* | (2006.01) |

(52) U.S. Cl.
CPC ........... *H04M 3/568* (2013.01); *H04L 65/4038* (2013.01); *H04L 65/601* (2013.01); *H04M 3/56* (2013.01); *H04L 65/4092* (2013.01); *H04M 3/42153* (2013.01)

(58) Field of Classification Search
None
See application file for complete search history.

(56) References Cited

U.S. PATENT DOCUMENTS

| | | | |
|---|---|---|---|
| 6,697,614 B2 | 2/2004 | Dorenbosch | |
| 6,853,716 B1 | 2/2005 | Shaffer et al. | |
| 6,952,592 B2 | 10/2005 | Dorenbosch | |
| 7,006,616 B1 | 2/2006 | Christofferson et al. | |
| 7,039,395 B2 | 5/2006 | Kundaje et al. | |
| 7,113,580 B1 | 9/2006 | DellaMorte, Sr. et al. | |
| 8,275,108 B2 | 9/2012 | O'Sullivan et al. | |
| 8,411,835 B2 | 4/2013 | Gorti et al. | |
| 9,019,868 B2 | 4/2015 | Gorti et al. | |
| 2003/0223562 A1 | 12/2003 | Cui et al. | |
| 2004/0052218 A1 | 3/2004 | Knappe | |
| 2005/0009550 A1 | 1/2005 | Akgun et al. | |
| 2005/0032539 A1 | 2/2005 | Noel et al. | |
| 2005/0069852 A1 | 3/2005 | Janakiraman et al. | |
| 2005/0152524 A1* | 7/2005 | Carlson et al. | 379/202.01 |
| 2005/0239486 A1 | 10/2005 | D'Avello et al. | |

(Continued)

OTHER PUBLICATIONS

United States Patent and Trademark Office, "Office Action," issued in connection with U.S. Appl. No. 12/039,575, May 1, 2012, 6 pages.

(Continued)

*Primary Examiner* — Minh-Trang Nguyen
(74) *Attorney, Agent, or Firm* — Hanley, Flight & Zimmerman, LLC

(57) ABSTRACT

Methods and apparatus to manage conference calls are described. An example method includes enabling, via a logic circuit, a first one of participants of a conference call to request an adjustment of a volume of a current speaker different than the first participant; and in response to a request from the first participant, adjusting, via the logic circuit, an amplification setting associated with the current speaker in a preference file associated with the first participant.

20 Claims, 7 Drawing Sheets

(56) References Cited

U.S. PATENT DOCUMENTS

2007/0058795 A1* 3/2007 Arrant et al. ............. 379/202.01
2007/0172047 A1 7/2007 Coughlan et al.

OTHER PUBLICATIONS

United States Patent and Trademark Office, "Office Action," issued in connection with U.S. Appl. No. 12/039,575, Aug. 21, 2012, 15 pages.

United States Patent and Trademark Office, "Notice of Allowance," issued in connection with U.S. Appl. No. 12/039,575, Nov. 30, 2012, 8 pages.

United States Patent and Trademark Office, "Notice of Allowance," issued in connection with U.S. Appl. No. 13/780,816, Dec. 18, 2014, 21 pages.

* cited by examiner

METHODS AND APPARATUS TO MANAGE CONFERENCE CALLS

RELATED APPLICATION

This patent arises from a continuation of U.S. patent application Ser. No. 13/780,816, filed Feb. 28, 2013, now U.S. Pat. No. 9,019,868, which is a continuation of U.S. patent application Ser. No. 12/039,575, filed Feb. 28, 2008, now U.S. Pat. No. 8,411,835. U.S. patent application Ser. No. 13/780,816 and U.S. patent application Ser. No. 12/039,575 are hereby incorporated herein by reference in their entireties.

TECHNICAL FIELD

The present disclosure relates generally to telecommunications, and more particularly, to methods and apparatus to manage conference calls.

BACKGROUND

Conference calls allow a plurality of participants to communicate simultaneously from multiple remote locations. The number of participants on a conference call can range from three into the hundreds.

DETAILED DESCRIPTION

During some conference calls, participants are not familiar with each other and may be unaware of the identity of the current speaker, leading to undesirable interruptions and general confusion. Further, varying volume levels from different participants may require recurring adjustments of the volume settings of a communication device. The volume at which a participant is heard may be dictated by a device (e.g., a cell phone or speakerphone) used to make the call, the environment (e.g., an office, car, or crowded place) from which the participant is calling, or a tendency to speak loudly or softly in comparison with the other participants of the conference call. Such factors may cause an audio signal from one participant to be transmitted at a blaring volume level, while another participant may be hardly audible.

Methods and apparatus to manage conference calls will now be disclosed. As described in further detail herein, an example method of managing a conference call includes enabling a participant of the conference call to request an adjustment of a volume of a current speaker and, in response to such a request, adjusting an amplification setting associated with the current speaker in a preference file corresponding to the requesting participant. The adjustment made to the amplification setting is stored (e.g., temporarily for the duration of the conference call or permanently for future conference calls) to avoid the need to continuously adjust a volume setting of the communication device used to participate in the conference call (e.g., a speakerphone or cellular telephone).

Another example method of managing a conference call includes, detecting an attempt of a first participant to interrupt a second participant having a higher priority value. In response to the attempt, the audio signal of the first participant is blocked and an identifier associated with the first participant is placed in a queue. The queue may include other participants who had attempted to interrupt a higher ranked participant. The audio signal of the first participant may later be unblocked according to the organization of the queue. This example method enables participants to avoid undesired and perhaps damaging interruptions of important participants (e.g., a supervisor, customer, or moderator).

Figure 1:
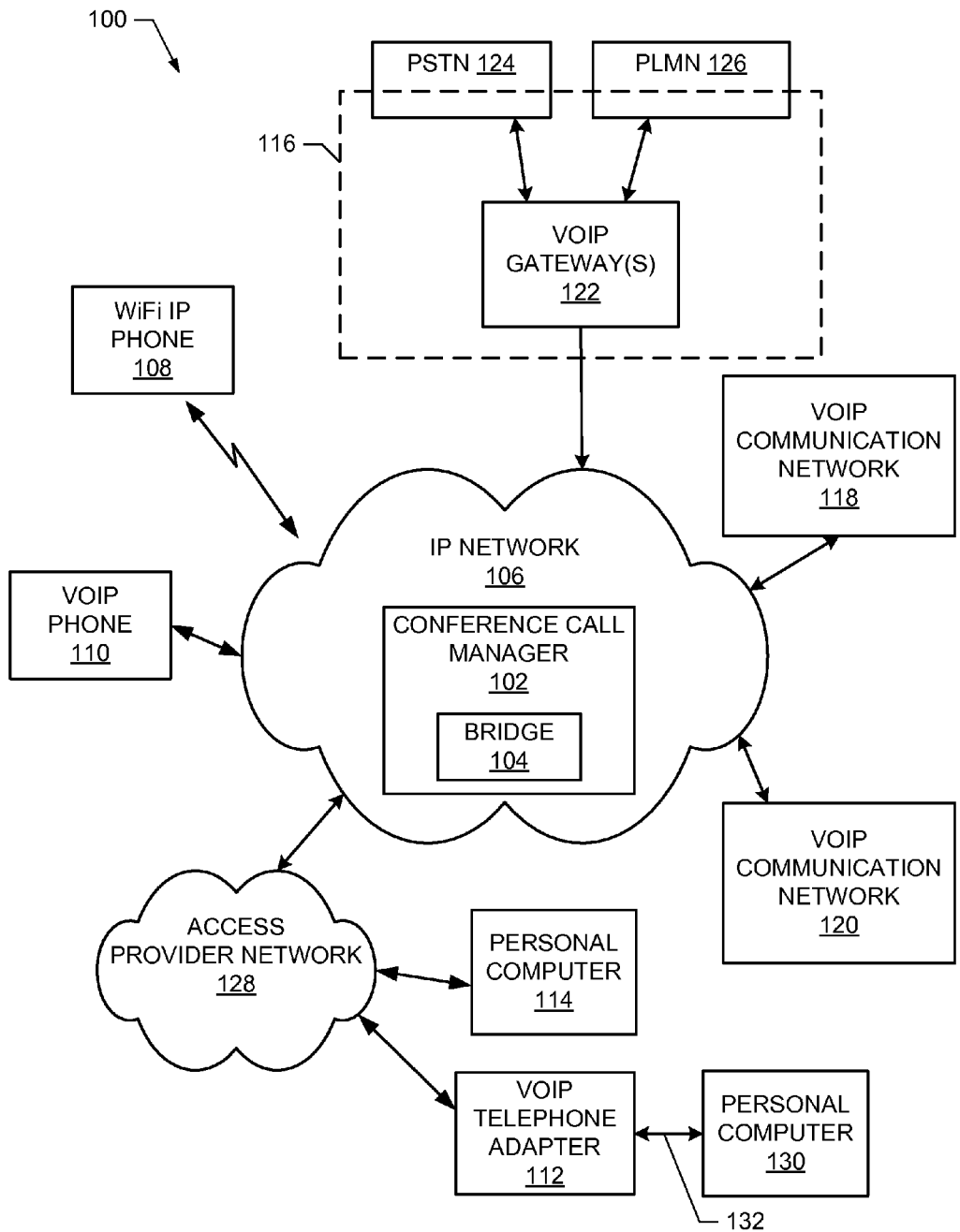
FIG. 1 is a schematic illustration of an example Internet protocol (IP) based communication system to manage a conference call.

FIG. 1 is a schematic illustration of an example Internet protocol (IP) based communication system 100 capable of implementing the methods and apparatus to manage conference calls described herein. To enable a plurality of participants to join a conference call and to manage one or more policies thereof, the example communication system 100 of FIG. 1 includes a conference call manager 102, which is described in greater detail below in connection with FIG. 2. In the illustrated example system 100 of FIG. 1, a conference call participant employs a VoIP-enabled device to dial a call-in telephone number, which may be dialed by all potential participants and is, thus, referred to as a "conference call telephone number" or, "call-in telephone number" or more succinctly, a "common telephone number." The conference call manager 102 may be assigned the common telephone number, a web address (e.g., HTTP), and/or an IP address. Further, the example conference call manager 102 of FIG. 1 includes or is communicatively coupled to a conference bridge 104 to permit the participants at the same and/or diverse locations to be connected. The example conference bridge 104 of FIG. 1 amplifies and/or balances audio signal levels (e.g., via a communication interface operatively coupled to one or more mixers and/or buffers, a codec, and a processor) for each of the callers so that every participant can hear and/or speak to each other during the conference call. As described in further detail below, the example conference call manager 102 of FIG. 1 enables participants to control or customize (e.g., via an instruction sent to the conference call manager 102 via a webpage) the amplification and/or balancing of the audio signal levels associated with individual participants.

To enable users to place and/or receive a voice over Internet Protocol (VoIP) based communication (e.g., a telephone service, Internet service, data service, messaging service, instant messaging service, electronic mail (e-mail) service, chat service, video service, audio service, gaming service, etc.), the example communication system 100 of FIG. 1 includes one or more VoIP-enabled devices, four of which are illustrated in FIG. 1 with reference numerals 108, 110, 112, and 114. Specifically, the illustrated example of FIG. 1 includes a wireless VoIP device 108 (e.g., a wireless-fidelity (a.k.a. Wi-Fi) IP phone), any corded and/or cordless VoIP phone 110, any VoIP adapter 112 (e.g., an analog telephone adapter (ATA)), and any VoIP enabled personal computer (PC) 114. While four example VoIP-enabled devices 108, 110, 112 and 114 are illustrated in FIG. 1, the example communication system 100 may include any number and/or type(s) of VoIP devices.

The example VoIP-enabled devices 108, 110, 112 and 114 of the illustrated example are configured to establish one or more communication sessions using, for example, Internet protocol (IP) based communication, universal datagram protocol (UDP) based communication, transmission control protocol (TCP) based communication, TCP/IP based communication, file transfer protocol (FTP) communication, and/or hyper-text markup language (HTML) based communication. Example data that may be exchanged and/or transmitted via a communication session includes, but is not limited to, digital pictures, audio, video, data files, advertisements, coupons, website information, etc. Communication sessions may also be used to send and/or exchange any number and/or type(s) of participant information (e.g., a conference call participant identification number, a password, a personal identification number (PIN), a user name, and/or a phone number).

Conference call communication sessions may be initiated and/or established during and/or after the establishment of a VoIP communication session, and as directed and/or initiated by a user of a VoIP-enabled device (e.g., the VoIP phone 110). For example, a participant may join a conference call from the VoIP-enabled devices 108, 110, 112 and 114 by pressing one or more general purpose and/or dedicated keys and/or buttons of an input interface, such as a keyboard, keypad, and/or touch screen, and/or by dialing the call-in telephone number and entering an authorization code. The VoIP-enabled device then responds to the user input by establishing a connection to the conference call based on, for example, the call-in telephone number and/or an IP address of the example conference call manager 102 stored in the memory of the VoIP-enabled device or as entered by the participant. The example conference call manager 102 of FIG. 1 may be located at a company associated with one or more of the conference call participants, and/or may be located at a third party conference call service provider, such as AT&T.

To provide IP-based communication services, the example system 100 of FIG. 1 includes any type(s) of communication networks, three of which are illustrated in FIG. 1 with reference numerals 116, 118 and 120. The example communication networks 116, 118, and 120 are implemented in accordance with, for example, one or more past, current and/or future standard such as the $3^{rd}$ Generation Partnership Program (3GPP) Internet Multimedia Subsystem (IMS) standard(s) and/or specification(s). In the illustrated example, each of the networks 116, 118, and 120 is associated with a different service provider; however, they could be associated with one service provider and/or two or more of the networks may be associated with the same service provider. While three networks 116, 118, and 120 are illustrated in FIG. 1, the communication system 100 of FIG. 1 may include any number and/or type(s) of communication networks operated by any number of service providers.

To initiate, receive, establish, complete and/or route any type(s) of communication sessions (e.g., VoIP telephone calls), the example communication network 116 of FIG. 1 includes and/or communicates with any portion of any type(s) of VoIP call processor(s) (not shown) and/or VoIP gateway(s) 122. In the example of FIG. 1, the example communication network 116 includes an interface to and/or contains a portion of a public switched telephone network (PSTN) 124, and an interface to and/or contains a portion of a public land-mobile network (PLMN) 126 (e.g., a cellular network). Additionally or alternatively, the example network 116 may include an interface to and/or contain a portion of any type(s) of communication networks. For example, using any type(s) of technique(s), method(s), protocol(s) and/or technology(-ies), the VoIP gateway 122 and the PSTN 124 can facilitate telephone calls between a PSTN-based phone (not shown) and any of the example VoIP devices 108, 110, 112, and 114. In the illustrated example of FIG. 1, the VoIP gateway(s) 122 implement a media gateway control function (MGCF). In the example of FIG. 1, the gateway(s) 122 are implemented by and/or within the example communication network 116. However, the example gateway(s) 122 may be associated with the communication network 116, the PLMN 126, the PSTN 124 and/or any other communication network.

The example PLMN 126 and/or the example PSTN 124 of FIG. 1 may be implemented by any type(s) of communication device(s), switch(es), protocol(s), system(s) and/or technology(-ies). For instance, the example PLMN 126 may include one or more cellular base stations that can transmit cellular signals to and/or receive cellular signals from a cellular communication device using any type(s) of protocols (e.g., time-divisional multiple access (TDMA), code-divisional multiple access (CDMA), etc.).

In the illustrated example of FIG. 1, the example VoIP devices 108, 110, 112, and 114 are communicatively coupled to the example communication networks 116, 118, and 120 via any type(s) of public and/or private IP network 106, such as the Internet. However, any type(s) of current and/or future communication network(s), communication system(s), communication device(s), transmission medium(s), protocol(s), technique(s) and/or standard(s) could be used to communicatively couple the VoIP devices 108, 110, 112, and 114 to one or more of the communication networks 116, 118, and 120. The example VoIP devices 108, 110, 112, and 114 may be coupled to the IP Network 106 via any type(s) of current and/or future device(s), technology(-ies) and/or method(s), including voice-band modem(s), digital subscriber line (DSL) modem(s), cable modem(s), Ethernet transceiver(s), optical transceiver(s), virtual private network (VPN) connection(s), Institute of Electrical and Electronics Engineers (IEEE) 802.11x (a.k.a. WiFi) transceiver(s), IEEE 802.16 (a.k.a. WiMax), access point(s), access provider network(s), etc. Moreover, the example IP Network 106 may extend geographically to include a location near to and/or encompassing one or more VoIP devices 108, 110, 112, and 114. For example, the IP Network 106 and/or a public and/or private access provider network (e.g., an example access provider network 128) may include a wireless access point (not shown) by which, for example, the example WiFi IP phone 108 connects to the IP Network 106. In some examples, an access provider network includes a DSL access multiplexer (DSLAM) that facilitates communicative coupling between a subscriber having a DSL modem and the IP Network 106. In some examples, an access provider network includes a cable modem headend that facilitates communicative coupling between a subscriber having a cable modem and the IP Network 106. In general, an access provider network 128 provides, implements and/or facilitates a communicative coupling between a VoIP device 108, 110, 112, and 114 and the IP network 106.

The example VoIP devices 108, 110, 112, and 114 of FIG. 1 may be communicatively coupled to an access provider (e.g., the example access provider network 128) and/or the IP network 106 via any type(s) of public and/or private local area networks (LANs) located within, for example, a residence, school and/or place of business, and/or via any type(s) of router(s), bridge(s) and/or gateway(s) located within and/or coupled to such public and/or private locations and/or LANs. For example, the example VoIP telephone adapter 112 is communicatively coupled to a PC 130 via a LAN 132. As described in further detail below, in the example of FIG. 1, the PC 130 or the PC 114 are used to facilitate (e.g., via the web-based user interface 400 of FIG. 4) an interaction between a participant and the conference bridge 104 and/or the conference call manager 104 to manage a conference call and/or one or more aspects thereof. Additionally, the PC 130 may be used to control and/or configure the example VoIP telephone adapter 112, the VoIP phone 110, or any other communicatively coupled VoIP-enabled device.

While an example VoIP communication system 100 has been illustrated in FIG. 1, the communication networks 116, 118, and 120, the access provider network 128, devices, servers, systems, gateways, portals, and/or processors illustrated in FIG. 1 may be combined, re-arranged, divided, eliminated and/or implemented in any of a variety of ways. For example, the example conference call manager 102 and/or the components or devices thereof may be implemented by and/or within a common server or on distributed servers. Further, the example VoIP devices 108, 110, 112, and 114, the example conference call manager 102, and/or, more generally, the example communication networks 116, 118, and 120 may be implemented by hardware, software, firmware and/or any combination thereof. Moreover, the example communication system 100 may include additional devices (e.g., servers, systems, gateways, portals, and/or processors) than those illustrated in FIG. 1 and/or may include more than one of any or all of the illustrated communication networks, access provider networks, devices, systems, and/or gateways.

Figure 2:
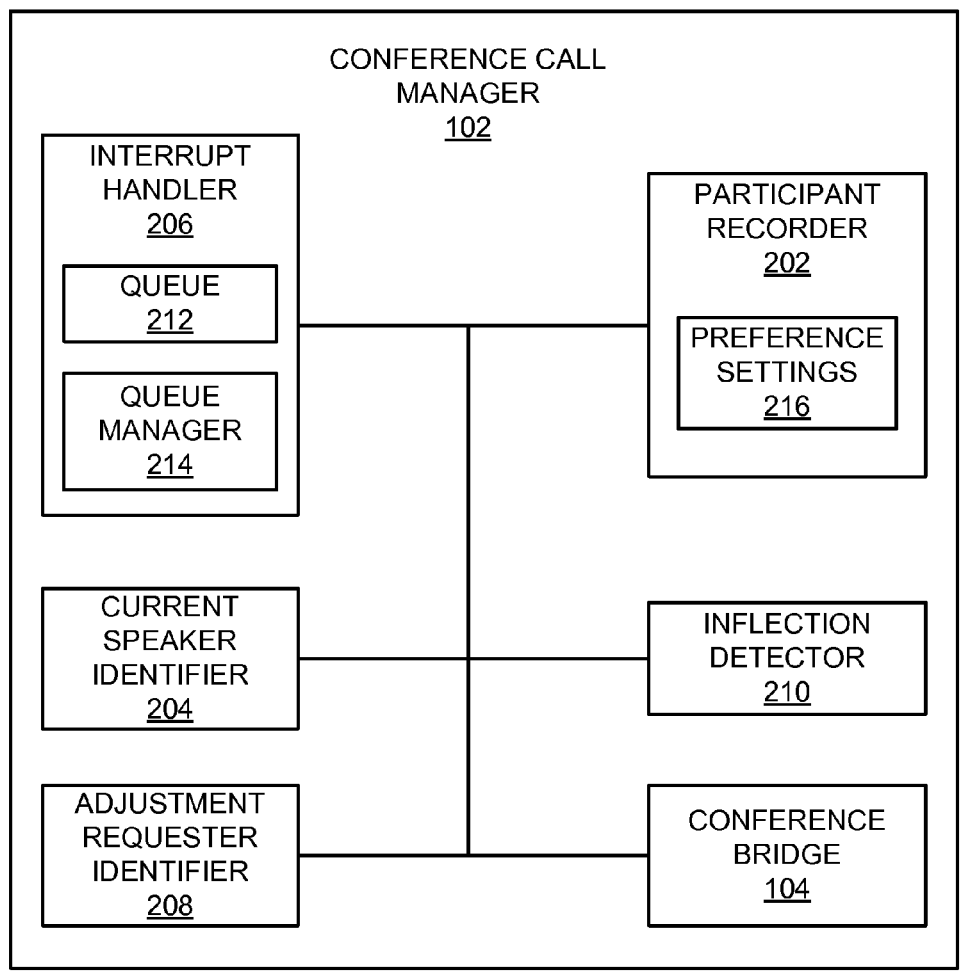
FIG. 2 illustrates an example implementation of the conference call manager of FIG. 1.

FIG. 2 illustrates an example manner of implementing the example conference call manager 102 of FIG. 1. Generally, the example conference call manager 102 stores and implements the policies that dictate the settings, restrictions, and/or rules of a conference call. For example, the conference call manager 102 is configured to receive volume adjustment requests and, in conjunction with the conference bridge 104, processes the requests to convey customizable audio signals to the different communication devices of the participants. Further, the example conference call manager 102 prevents interruptions of highly ranked participants (e.g., a supervisor or conference call moderator) by lower ranked participants (e.g., an associate or newly hired employee) according to a hierarchy tracked and stored by, for example, the conference call manager 102.

To perform, inter alia, the above tasks, the example conference call manager 102 includes a participant recorder 202, a current speaker identifier 204, an interrupt handler 206, an adjustment requester identifier 208, an inflection detector 210, a queue 212, a queue manager 214, preference settings 216, and, as described above in connection with FIG. 1, a conference bridge 104, all of which are communicatively coupled and implemented by and/or within, for example, common or distributed media servers of a conference call service provider (e.g., AT&T). Further, the example components of the example conference call manager 102 and, more generally, the example communication system 100 of FIG. 1, including the conference bridge 104, the participant recorder 202, the current speaker identifier 204, the interrupt handler 206, the adjustment requester identifier 208, the inflection detector 210, the queue 212, the queue manager 214, and/or the preference settings 216 may be implemented by hardware, software, firmware and/or any combination of hardware, software, and/or firmware.

As described above, a communication session between a participant and the conference call manager 102 is initiated by, for example, the participant dialing a common telephone number assigned to the conference call manager 102. The participant recorder 202 stores identifying information for some or all of the participants that access the conference call using any of type(s) of data structure(s), array(s), table(s), database(s) or variable(s). Example identifying information includes, by way of example, not limitation, a conference call participant identification number, a password, a personal identification number (PIN), a user name, and/or a phone number. The participant recorder 202 of the illustrated example associates the identifying information it receives from callers with the communication device(s) used to communicate information to the conference call manager 102. Additionally or alternatively, the VoIP-enabled device of each participant may include a device identifier that uniquely identifies the VoIP-enabled device, such as a manufacturing serial number, a media access control (MAC) address, etc. The example participant recorder 202 of the illustrated example stores phone numbers as identifiers for the participants. In some examples, where a participant joins the conference call using the PC 114 or the VoIP telephone adapter coupled to the PC 130 of FIG. 1, additional or alternative identifiers (e.g., IP addresses) may be utilized by the participant recorder 202.

As illustrated in FIG. 2, the participant recorder 202 is in communication with the preference settings 216. In the illustrated example, the preference settings 216 are files stored in memory (e.g., a database stored in memory of the conference bridge 104) accessible by the participant recorder 202. Some or all of the settings may alternatively or additionally be created anew at the start or creation of the conference call. Such newly created settings are added to the entries in the memory by the participant recorder 202. For example, for a system in which the conference call manager 102 typically manages repeat participants, the preference settings 216 of the participants may be semi-permanently stored in memory. Additionally or alternatively, where new participants typically comprise, for example, a majority of the participants, the preference settings 216 may be temporarily stored with the entries created by the participant recorder 202 during, for example, the duration of the conference call (e.g., until no participants are connected to the conference call manager 102 and/or the conference bridge 104). The entries may then be purged.

In the example of FIG. 2, the preference settings 216 include or are linked to a plurality of priority rankings for the participants based on, for example, a corporate position (chief executive officer (CEO), secretary, chief patent counsel, etc.). As described in greater detail below, the priority rankings are used to, for example, settle attempts of multiple participants to speak substantially simultaneously. The preference settings 216 of FIG. 2 further include a plurality of amplification settings associated with corresponding participants of the conference call. As described in greater detail below, a first participant (participant A) may consider the audio signal from the current speaker (participant B) to be too loud. However, participant A may consider the audio signals from the remainder of the participants to be received at an acceptable volume level. Using the example the web-based user interface 400 of FIG. 4, participant A may engage a current speaker soft-key 412 on a webpage associated with or in communication with the conference call manager 102 to indicate a desire to lower (or raise) the amplification setting (e.g., by a factor ranging from 1-100) associated with the current speaker. The "current speaker" is automatically identified by the current speaker identifier 204. The adjustment requester identifier 208 automatically identifies the participant (e.g., participant A) that requested an adjustment of the amplification setting associated with the current speaker. The participant recorder 202 responds to the user input and the identifications made by the current speaker identifier 204 and the adjustment requester identifier 208 by making an entry in a preference file in the preferences settings 216 corresponding to the user requesting the amplification change. Alternatively, a participant may feel that the overall volume of the conference call is too loud or soft and, thus, may engage a universal volume soft-key 418 on the webpage to indicate a desire to raise or lower the overall volume. In response, the participant recorder 202 adjusts a universal amplification setting in a preference file in the preference settings 216 corresponding to the user requesting the universal volume setting change.

The conference bridge 104 references the preference settings 216 and sets the amplification level(s) based thereon before conveying the audio signals to the communication devices of each participant. In the example of FIG. 2, one or more mixers and/or buffers of the conference bridge 104 are configured to utilize the amplification settings to calculate an aggregate audio signal (e.g., the sum of the inputs being received from unblocked participants) to be conveyed to each participant. In particular, each received audio signal received from each participant adjusted (e.g., as part of a matrix multiplication operation) using the corresponding amplification setting retrieved from the intended participant's preference file before the audio signal is added to the aggregate audio signal. The amplification and/or preference settings 216 may be used in other example operations to provide a communication device a customized audio signal representing the preference(s) of a user of that communication device. The preference settings 216 may be altered at any time during the call via, for example, a web-based user interface (e.g., the example user interface 400 of FIG. 4).

To compensate for any loss of expression caused by the volume adjustment(s) described above, the example conference call manager 102 of FIG. 2 includes an inflection detector 210. The example inflection detector 210 of FIG. 2 monitors the conference call (e.g., via a communication interface, buffer(s), and/or mixer(s) of the conference bridge 104) for any sharp or dramatic change(s) in volume (e.g., as a result of yelling) from any of the participants. Such a change in volume may be lost in the transmission of the audio signal to the communication devices of certain participants due to, for example, a low amplification setting associated with a current speaker. The example inflection detector 210 is configured to visually communicate this type of expression. In particular, the example inflection detector 210 monitors incoming audio signals before and/or during the calculation of the outgoing aggregate audio signals described above. In response to a detected sharp variation in volume, the inflection detector 210 sends an instruction, (e.g., via the IP network 106) to a server maintaining a webpage associated with the conference call to cause the webpage to display an indicator (e.g., the indicator 416 of FIG. 4) and/or corresponding text (e.g., 'Yelling' or 'Loudly'). Thus, while listening participants may not audibly receive the intended expression of the current speaker (e.g., due to volume adjustments made according to the preference settings 216), the inflection detector 210 visually informs participants of any pre-adjustment variations in, for example, the tone of the current speaker.

To organize the conference call and prevent unwarranted interruptions, the example interrupt handler 206 of FIG. 2 includes the queue 212 and the queue manager 214. Generally, the example interrupt handler 206 monitors the conference call for simultaneous incoming audio signals, blocks the audio signals of lower ranked participants (e.g., prevents the transmission to other participants by removing the incoming audio signal of the lower ranked participant from the outgoing aggregate audio signal to be conveyed to participants), and places an identifier corresponding to the blocked participant in the queue 212. The order of identifiers in the queue 212 determines the order in which the audio signals of the blocked participants will be unblocked. To determine whether one participant should be blocked from interrupting another participant, the interrupt handler 206 obtains and/or references identifying information stored by the participant recorder 202, which, as described above, has access to the preference settings 216 and, thus, the priority rankings of the participants. The interrupt handler 206 then performs a comparison of the priority rankings associated with the competing speakers. The results of the comparison are used to enforce a desired policy. In the illustrated example, a higher ranked participant is able to cut off (e.g., cause a blockage of the audio signal of) a currently speaking lower ranked participant. In other words, the incoming audio signal of the current speaker may be blocked by an incoming audio signal from a higher ranked speaker such as, for example, a moderator that is assigned the highest priority ranking. Similarly, when two speakers attempt to speak at substantially the same time, the voice of the higher ranking speaker will be passed, while the voice of the lower ranking speaker will be blocked. When participants are of the same priority ranking, no blocking of any audio signal may occur and a mixed (e g, summed) audio signal of each similarly ranked participant may be conveyed.

In the illustrated example, the queue manager 214 manages and/or organizes the queue 212 according to a behavior-based policy. Specifically, the order in which blocked participants are allowed to speak (e.g., by unblocking the corresponding audio signal) is based on, for example, a point system. In the illustrated example, the queue manager 214 places the participant having the highest point total at the front of the queue 212, thereby allowing that participant to speak first among the members of the queue 212. Rules of the behavior-based policy are implemented to, for example, reward patient participants and/or to curb any adverse effects caused by aggressive participants (e.g., frequent interruptions). The queue manager 214 assigns some or all of the participants an initial point value, which is stored in, for example, the preference settings 216, memory linked to the queue 212, and/or any other suitable location. The point value corresponding to each participant may be retained for future conference calls, purged at the conclusion of the conference call, or maintained otherwise by the queue manager 214. The queue manager 214 has access to the point value and manipulates the point value to reflect the desirable queue position (e.g., according to the behavior-based policy as determined by, for example, a conference call moderator) of the corresponding participant. Example point allocations include lowering the corresponding individual's point total for each attempted interruption, lowering the corresponding individual's point total for extended periods of speaking (e.g., when a participant "has the floor" for a time greater than a predetermined threshold), assigning an initial point value based on a priority ranking or how many participants are currently in the queue 212, raising the corresponding individual's point total for highly relevant statements or questions, lowering the corresponding individual's point total for substantially irrelevant statements or questions, and/or adjusting the corresponding individual's point total in response to input received from other participants (e.g., feedback provided via the web-based user interface 400 of FIG. 4). For example, one participant may inform the conference call manager 102 that the currently speaking participant has uttered a highly relevant or irrelevant statement or phrase. In the illustrated example, the relevancy of a statement or question is automatically determined based on a comparison between spoken words or phrases (e.g., as detected via a speech recognition module implemented by the example processor 501) and one or more keywords associated with the conference call (e.g., in an agenda stored in memory linked to the conference call manager 102). In the illustrated example, more points are awarded to those participants that say certain words more often. The keywords may be chosen by a moderator, taking from a title of the conference call, or otherwise selected. Additionally or alternatively, the conference participants can use the web-based user interface 400 to enter feedback on the relevancy of questions and/or statements made by a speaker. Such feedback can be compiled by the queue manager 214 and used to increment or decrement the point total of the corresponding speaker.

Alternatively, the queue manager 214 may manage and/or organize the queue 212 such that the first (in time) participant to unsuccessfully attempt to interrupt a higher ranked participant is placed at the front of the queue 212 and is, thus, unblocked first. Alternatively, the queue manager 214 may sort the identifiers in the queue 212 such that the highest ranked blocked participant is placed at the front of the queue 212 and is, therefore, unblocked first.

The current speaker identifier 204 may utilize, for example, voice verification and/or speaker recognition systems to associate the incoming audio signal(s) with current speaker(s). The voice verification and/or speaker recognition system(s) may be implemented by software executed on a processor (e.g., the processor 510 of the processor platform 500 of FIG. 5). Additionally or alternatively, the current speaker identifier 204 may use any available identifying information (e.g., a conference call participant identification number, a password, a personal identification number (PIN), a user name, and/or a phone number) transferred to the conference call manager 102 to identify speaker(s) by, for example, detecting the source (e.g., computer address) of an incoming audio signal. For example, if the example current speaker identifier 204 illustrated in FIG. 2 obtains a conference call participant identification number from a communication device transmitting incoming audio data, the identification number is then used to determine an identity of the current speaker by referencing the participant's record, which correlates identification number(s) to participant(s) of the conference call. The example current speaker identifier 204 of the illustrated example ignores (e.g., excludes in the process of identifying the current speaker) incoming audio signals being transmitted below a predetermined threshold level (e.g., a decibel level), thereby excluding ambient noise not associated with the current speaker.

Similarly, the adjustment requester identifier 208 may utilize identifying information sent by one or more communication devices to the conference call manager 102 to determine the identity of an adjustment requester. In the illustrated example of FIG. 2, when a participant requests an adjustment of an amplification setting associated with the current speaker or a universal volume setting via the web-based user interface 400 of FIG. 4, the adjustment requester identifier 208 determines the IP address of the communication device that engaged a volume adjustment key on the web-based user interface 400. The adjustment requester identifier 208 can then reference the files managed by the participant recorder 202 to determine which participant is associated with the detected IP address.

While an example manner of implementing the conference call manager 102 of FIG. 1 has been illustrated in FIG. 2, one or more of the elements, processes and/or devices illustrated in FIG. 2 may be combined, divided, re-arranged, omitted, eliminated and/or implemented in any other way. Further, the example conference bridge 104, the example participant recorder 202, the example current speaker identifier 204, the example interrupt handler 206, the example adjustment requester identifier 208, the example inflection detector 210, the example queue 212, the example queue manager 214, the example preference settings 216, and/or, more generally, the example conference call manager 102 of FIG. 2 may be implemented by hardware, software, firmware and/or any combination of hardware, software and/or firmware. Thus, for example, any of the example conference bridge 104, the example participant recorder 202, the example current speaker identifier 204, the example interrupt handler 206, the example adjustment requester identifier 208, the example inflection detector 210, the example queue 212, the example queue manager 214, the example preference settings 216 and/or, more generally, the example conference call manager 102 could be implemented by one or more circuit(s), programmable processsor(s), application specific integrated circuit(s) (ASIC(s)), programmable logic device(s) (PLD(s)), and/or field programmable logic device(s) (FPLD(s)), etc. When any of the appended claims are read to cover a purely software implementation, at least one of the example conference bridge 104, the example participant recorder 202, the example current speaker identifier 204, the example interrupt handler 206, the example adjustment requester identifier 208, the example inflection detector 210, the example queue 212, the example queue manager 214, the example preference settings 216 and/or, more generally, the example conference call manager 102 are hereby expressly defined to include a tangible medium such as a memory, DVD, CD, etc. Further still, the example conference call manager of FIG. 2 may include one or more elements, processes and/or devices in addition to, or instead of, those illustrated in FIG. 2, and/or may include more than one of any or all of the illustrated elements, processes and devices.

Figure 3A:
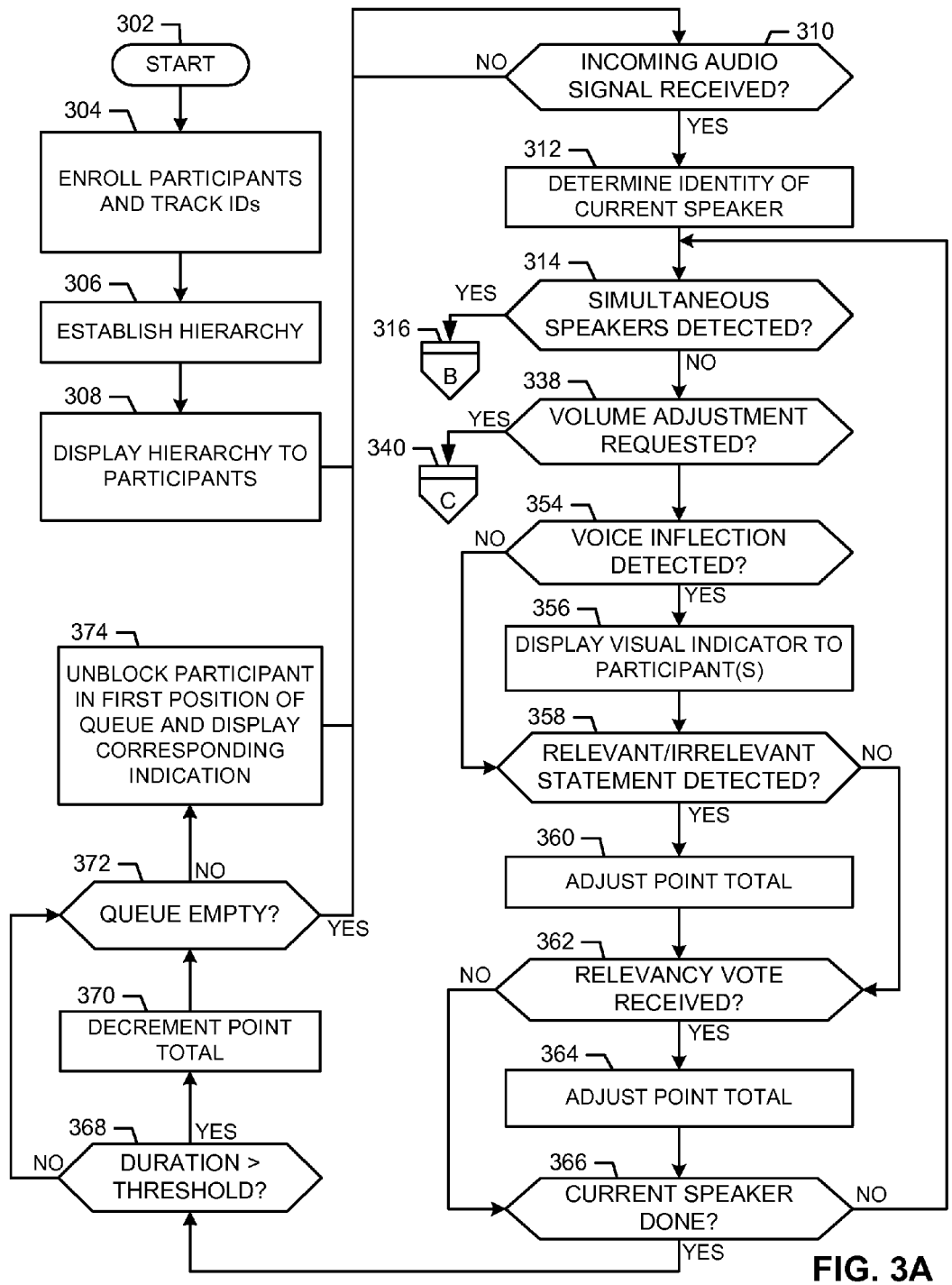
FIGS. 3A-C is a flowchart representation of machine readable instructions that may be executed to implement the system of FIG. 1.
Figure 3B:
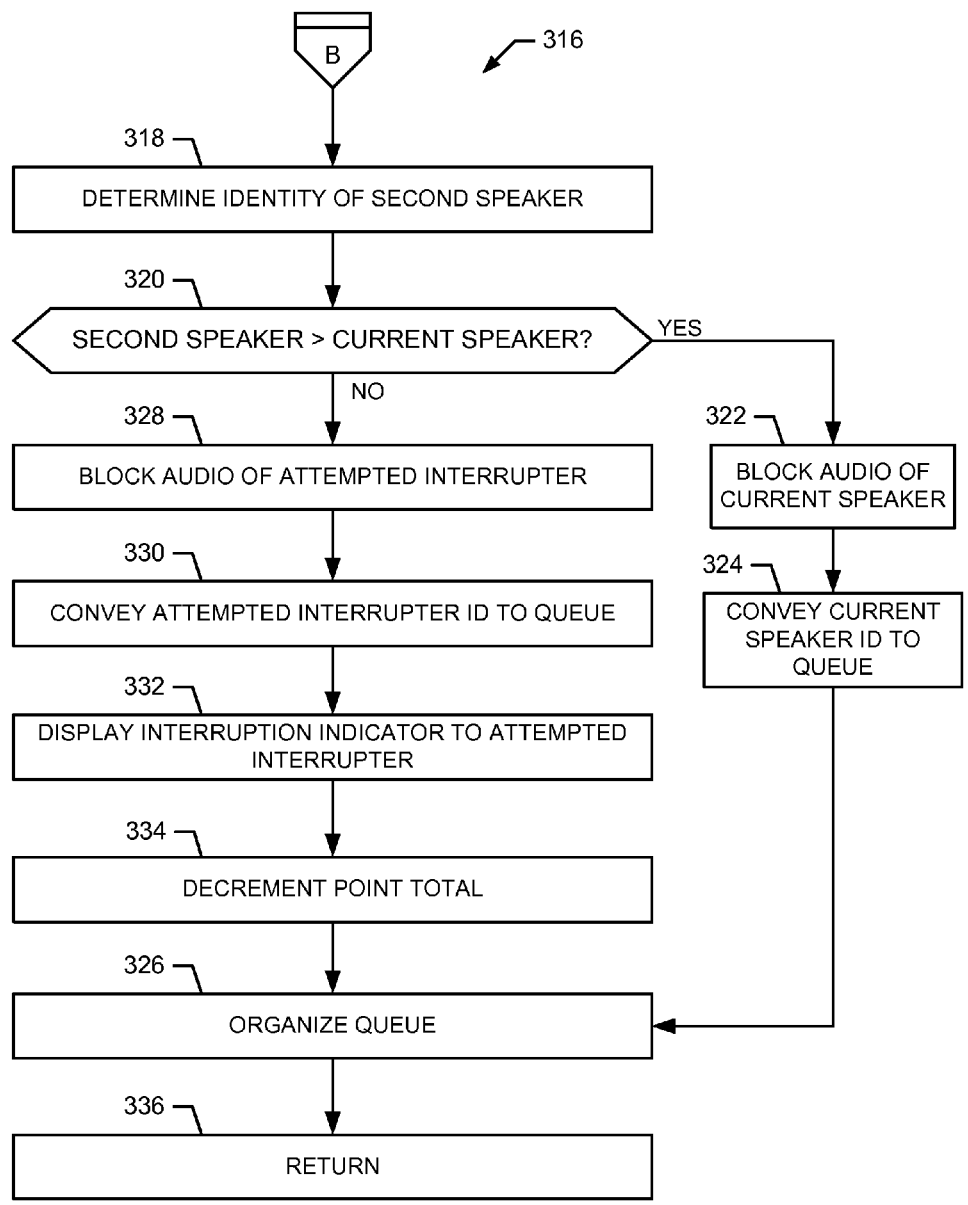
Figure 3C:
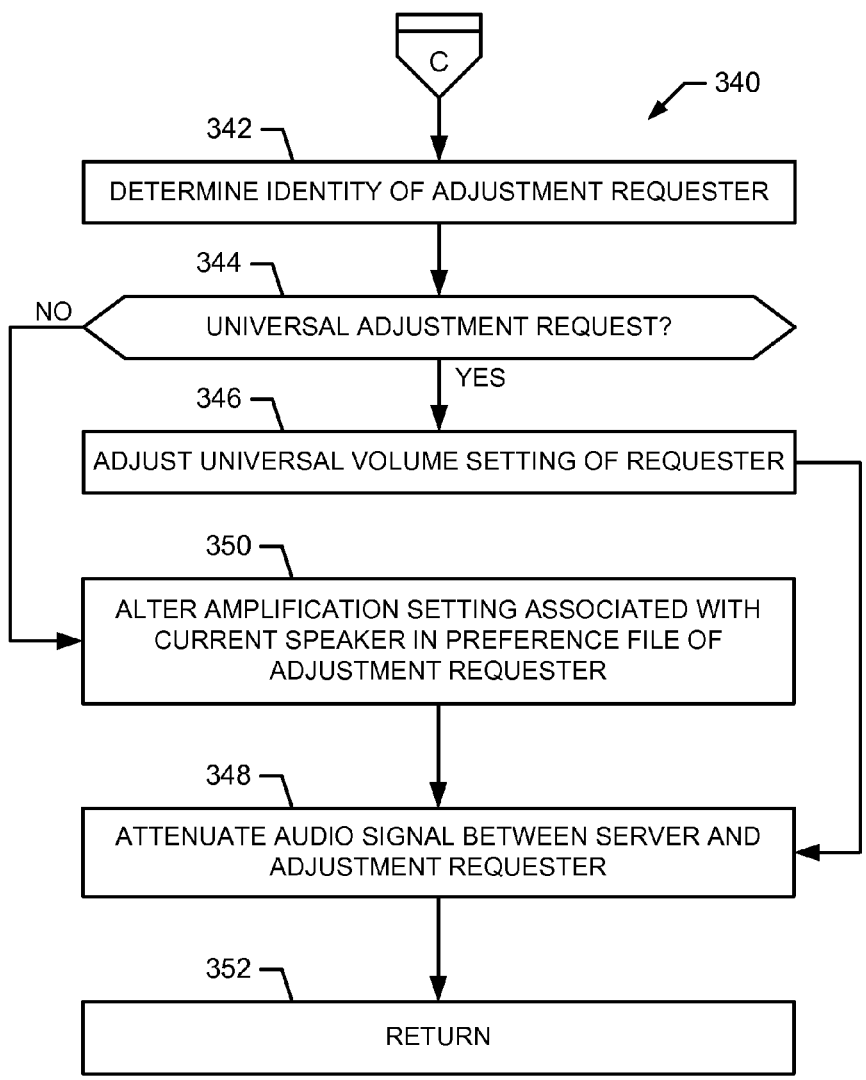

FIGS. 3A, 3B, and 3C illustrate a flowchart representing machine readable instructions that may be executed to implement the system of FIGS. 1-2. The example machine accessible instructions of FIGS. 3A, 3B, and/or 3C may be executed by a processor, a controller and/or any other suitable processing device. For example, the example machine accessible instructions of FIGS. 3A, 3B, and/or 3C may be embodied in coded instructions stored on a tangible medium such as a flash memory, or RAM associated with a processor (e.g., the example processor 501 discussed below in connection with FIG. 5). Alternatively, some or all of the example flowcharts of FIGS. 3A, 3B, and/or 3C may be implemented using any type(s) of ASIC(s), PLD(s), FPLD(s), discrete logic, hardware, firmware, etc. Also, some or all of the example flowcharts of FIGS. 3A, 3B, and/or 3C may be implemented manually or as any combination(s) of the foregoing techniques, for example, as any combination of firmware, software, discrete logic and/or hardware. Further, although the example machine accessible instructions of FIGS. 3A, 3B, and 3C are described with reference to the flowcharts of FIGS. 3A, 3B, and 3C, many other methods of implementing the conference call manager 102 and/or, more generally, the VoIP communication system 100 of FIGS. 1-2, including the conference bridge 104, the participant recorder 202, the current speaker identifier 204, the interrupt handler 206, the adjustment requester identifier 208, the inflection detector 210, the queue 212, the queue manager 214, and/or the preference settings 216 may be employed. Further, the order of execution of the blocks of FIGS. 3A, 3B, and/or 3B may be changed, and/or some of the blocks described may be changed, eliminated, sub-divided, or combined. Additionally, the example machine accessible instructions of FIGS. 3A, 3B, and/or 3C may be carried out sequentially and/or carried out in parallel by, for example, separate processing threads, processors, devices, discrete logic, circuits, etc.

Figure 4:
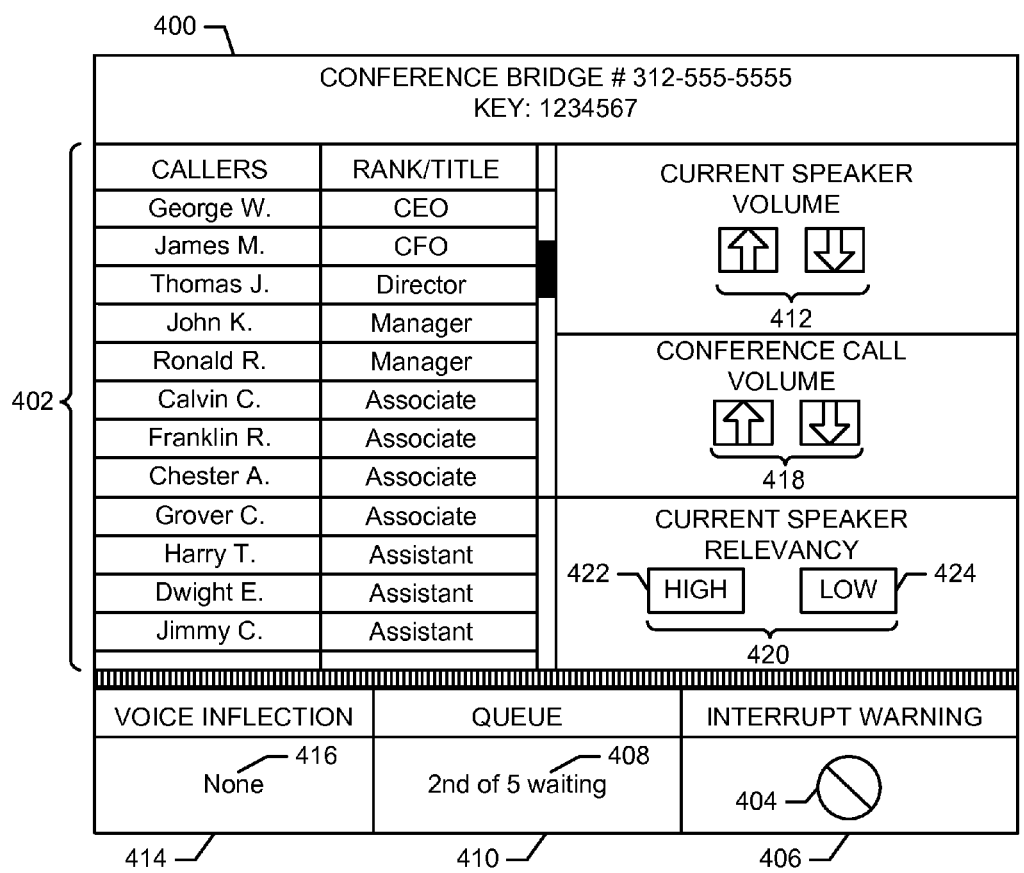
FIG. 4 illustrates an example user interface to be displayed to a user during a conference call.

FIGS. 3A, 3B, and 3C are described below in conjunction with an example user interface 400 illustrated in FIG. 4 to be used by a participant of a conference call. The example user interface 400 is implemented on a website hosted by a server that is communicatively coupled (e.g., via the IP Network 106 of FIG. 1) to the conference call manager 102 of FIG. 1. As described in further detail below, the website enables the participant to configure, control and/or monitor a VoIP-enabled device and/or one or more aspects of the conference call (e.g., volume settings, queue position, interruption warning, etc.). Further, one or more webpages associated with the website and served by the server may be personalized to individual participant(s) of the conference call based on, for example, participant or device identification information, account information, etc. associated with each individual participant or group of participants.

The website may be accessed via, for example, a web browser executed on a personal computer, a cellular phone, a personal digital assistant (PDA), or any other device capable of accessing a website. In some examples, the website is accessed by a web browser on a VoIP-enabled PC on which the participant is making the call to the conference call device.

The machine readable instructions of FIG. 3A begin when one or more communication device(s) (e.g., the VoIP-enabled devices 108, 110, 112, and/or 114 of FIG. 1) attempt to join a conference call by, for example, dialing a common telephone number or IP address assigned to the conference call manager 102 of FIG. 1, which is configured to implement a conference call and/or the policies thereof (block 302). Participants that successfully join the conference call (e.g., by entered the correct authorization code) are enrolled (e.g., granted access to the conference call) and an identifier associated with each enrolled participants is detected and stored in the participant record 202 of FIG. 2 to track the participants during and/or after the conference call (block 304). For example, at the onset of the conference call, participants may be required to enter a password, key, registration number, and/or any other type of identifying information before being enrolled. Additionally or alternatively, as described above, identifying information may be automatically transmitted to the conference call manager 102 in, for example, data packets sent over an IP network (e.g., the IP Network 106 of FIG. 1). For example, a communication device may automatically transmit a device identification number that is associated with a known participant. In some examples, the telephone number or IP address from which the participant called may be used as identifying information.

The identifying information received by the conference call manager 102 may include or may be linked to a database including a title (e.g., vice president, manager, associate), an assignment (e.g., marketing, sales, distribution), a position (e.g., lower level, mid-level, very important person), or any other identifier that may be used to establish a hierarchy of participants (block 306). The hierarchy may be set according to the policies of the conference call, which may be determined by, for example, a moderator or a host of the conference call and stored in memory of the conference call device. In the illustrated example of FIG. 3A, the hierarchy is displayed to indicate the identity of the participants of the conference call (block 308). An example hierarchy 402 is illustrated in the example user interface 400 of FIG. 4. The example hierarchy 402 includes names and ranks/titles arranged in a list format, which may be sorted, scrolled, and/or rearranged using any type(s) of techniques or methods.

Upon the detection of an incoming audio signal (block 310), the current speaker identifier 204 determines the identity of the source of the audio signal (i.e., the current speaker) (block 312). For example, a communication interface of the conference bridge 104 of FIG. 1 receives an input from a communication device (e.g., the PC 114 of FIG. 1) and passes it to the current speaker identifier 204 of FIG. 2. The current speaker identifier 204 determines the source of the input (e.g., via speaker recognition or identifying information transmitted from the communication device). The current speaker identifier 204 stores (e.g., temporarily in a register of memory) the identity of the current speaker and/or cooperates with the participant recorder 202 of FIG. 2 to designate an entry corresponding to a participant in a database as the current speaker.

At any given time, one or more participants may attempt to interject or interrupt the current speaker and/or two speakers may attempt to speak at the same time. Such an attempt is manifested by two audio signals being simultaneously transmitted to the conference bridge 104 at a volume level audible to the other participants (block 314). FIG. 3B illustrates a flowchart representation of machine-readable instructions that may be executed in response to such a detection (block 316). When two audio signals are detected, the current speaker identifier 204 identifies the two speakers (block 318). If one of the speakers was speaking at the time another speaker spoke, the second speaker is an interrupter and is referred to as the second speaker in the following. If neither of the speakers is an interrupter (the speakers are attempting to speak at substantially the same time), the first detected speaker is designated the "current speaker" and the second detected speaker is designated the "second speaker" in the following methodology. Alternatively, the designation of "current speaker" and "second speaker" can be arbitrary when, for example, it is difficult to determine which speaker spoke first. Using the identifying information of the speakers, the interrupt handler 206 compares a priority ranking of the second speaker (e.g., as obtained from the participant record 202 of FIG. 2) to the priority ranking of the current speaker (as identified above at block 312) (block 320). In the illustrated example of FIG. 3B, if the priority ranking of the second speaker is greater than the priority ranking of the current speaker, the interrupt handler 206 blocks the audio of the current speaker is blocked, thereby enabling the higher ranked second speaker to be heard (block 322). For example, the audio of the current speaker may be blocked by restricting one or more devices (e.g., mixer(s) and/or buffer(s)) of the conference bridge 104 of FIG. 1) from adding the audio signal originating from the communication device of the current speaker to the aggregate conference call output stream.

Further, the interrupt handler 206 sends the identifier associated with the blocked participant to the queue 212 of FIG. 2 (block 324). In the illustrated example of FIG. 3B, the queue manager 214 places the identifier of the blocked speaker in the queue 212 at a position dictated by a behavior-based policy. As described above, the queue manager 214 implements a point system to determine the order in which blocked participants are subsequently allowed to speak after being placed in the queue 212. Implementing the point system includes assigning an initial point total to some or all of the participants and storing the point total(s) in the preference settings, in memory linked to the queue 212, and/or at any other suitable location. In the illustrated example, the queue manager 214 references the point total(s) when organizing the queue 212 and adjusts the point total(s) according to the behavior-based policy described herein. The behavior-based policy of the illustrated example dictates that the participant having the highest point total in the queue 212 is allowed to speak first. The queue manager 214 may alternatively organize the queue 212 in any other way (e.g., first-in-first-out (FIFO), last-in-first-out (LIFO), by priority ranking, etc.). Upon an addition to (or removal from) the queue 212, the queue manager 214 organizes the queue 212 (e.g., reorders the identifiers of blocked participant according to their corresponding point totals) to reflect the order or status of the currently blocked participants (block 326).

Returning to block 320, if the priority ranking of the second speaker is less than or equal to that of the current speaker, the audio of the second speaker is blocked (block 328) and the corresponding identifier is conveyed to the queue (block 330). Upon such an attempted interruption, the interrupt handler 206 causes an interruption indicator to be conveyed to the lower ranked participant (block 332). For example, as illustrated in the example user interface 400 of FIG. 4, a warning symbol 404 is displayed (e.g., as a flashing image) in a section 406 dedicated to informing the participant of a blocked attempt to interrupt another participant. Moreover, the blocked participant may be informed, via an indicator 408 in a section 410 dedicated to the queue 212, of a queue position (e.g., how many other participants in the queue 212 will be unblocked before the blocked participant is allowed to speak). In the illustrated example, the queue manager 214 decrements the second speaker's point total according to the behavior-based policy to reflect a tendency of the second speaker to interrupt other participants (block 334). Again, in response to addition(s) to (or removal(s) from) the queue 212, the queue manager 214 organizes the queue 212 (block 326), after which control returns to the machine-readable instructions of FIG. 3A (block 336).

As described above, a participant may consider the volume of the current speaker to be too loud or soft and, in response, may request a volume adjustment of the current speaker as transmitted to the communication device of the requesting participant (FIG. 3A, block 338). In the illustrated example user interface 400 of FIG. 4, the request is made by selecting soft-key(s) (e.g., images of button(s)), such as current speaker soft-key(s) 412 or universal volume setting soft-key(s) 418, disposed on the HTML page associated with the conference call. FIG. 3C is a flowchart representative of example machine-readable instructions that may be executed in response to such a request (block 340).

Upon detecting a request, the adjustment requester identifier 208 identifies the participant that requested the adjustment (block 342) by, for example, determining an IP address from which the request was made. Specifically, clicking (e.g., using a mouse or keyboard key of the PC 114 of FIG. 1) one of the dedicated keys 412 or 418 causes the web browser to send a message (e.g., a series of data packets) over a network (e.g., the IP Network 106 of FIG. 1) to the conference call manager 102 of FIGS. 1 and/or 2. The transmitted message includes the IP address of the sender along with the payload of the transmitted message. Other types of identifying information (e.g., a device identifier associated with the communication device accessing the website) may be transmitted (e.g., as a portion or object of the message) and used by the adjustment requester identifier 208 of the conference call manager 102 to obtain the identity of the requesting participant.

When the source of the request has been obtained, the adjustment requester identifier 208 of FIG. 2 then determines which participant is associated with the source. For example, the obtained IP address may be linked to one of the participants in a database maintained by the participant recorder 202 of FIG. 2 as a semi-permanent or temporary entry. The IP address, or other identifying information, may have been linked to a participant by the participant recorder 202 when the participant joined the conference call. For example, the participant may be required to enter a username or other identification information when accessing (e.g., logging onto) the website. The IP address and the entered identification information may be logged by the participant recorder 202 of FIG. 2 and/or stored for (at least) the duration of the conference call.

Using the identity information obtained by the adjustment requester identifier 208, the participant recorder 202 adjusts the preference settings of the adjustment requester in accordance with the information in the request message. The payload of the transmitted messages includes the type(s) of adjustment requested, the magnitude of the requested adjustment, and/or the direction of the requested adjustment (e.g., louder or softer). The type of requested adjustment may be a request to adjust the universal volume setting of the conference call as transmitted to the communication device of the requesting participant. For example, the requesting participant may feel that the overall volume of the conference call is too loud or soft and may not be able to further adjust the volume settings of the communication device receiving the conference call audio signal. In the illustrated example of FIG. 4, the universal volume key(s) 418 may be engaged to make such an adjustment. If the type of the request is a universal adjustment (block 344), the participant recorder 202 adjusts a universal amplification setting in the preference settings associated with the requesting participant (block 346). The conference bridge 104 then references the preference settings 216 when conveying the audio signal to the adjustment requester (block 348), and the altered universal amplification setting causes the aggregate audio signal (e.g., the combination of unblocked audio signals being received from the conference call participants) being conveyed to the adjustment requester to be raised or lowered in volume without affecting the audio signal(s) being conveyed to other participants.

Alternatively, the payload of the transmitted message may indicate that one of the current speaker keys 412 was engaged. If so, the amplification setting associated with the current speaker (as identified above at block 312) in the preference settings of the adjustment requester is raised or lowered by the participant recorder 202 (block 350). Thus, although the requesting participant may not be aware of the identity of the current speaker, the volume at which the current speaker is received by the requesting participant is altered for the duration of the call and, if the records from the call are maintained and reused in subsequent call(s), the volume settings are applied in those calls. The conference bridge 104 then conveys the audio signal to the requesting participant according to the newly altered preference settings 216, without affecting the audio signals conveyed to the other participants (block 348). For example, as described above, the conference bridge 104 of the conference call manager 102 may multiply (e.g., via any of a variety of matrix operations) an incoming audio signal of the current speaker by an amplification setting (e.g., a percentage factor) associated with the current speaker in the preference file of the adjustment requester, such that the incoming audio signal of the current speaker forms a customized portion of the aggregate outgoing audio signal to be conveyed to the adjustment requester. Control then returns to the machine-readable instructions of FIG. 3A (block 352).

As described above, the inflection detector 210 of FIG. 2 monitors the conference call (e.g., via a communication interface, buffer(s), and/or mixer(s) of the conference bridge 104) for any sharp or dramatic change(s) in volume (e.g., as a result of yelling) from any of the participants. If such an inflection is detected (block 354), the inflection detector 210 sends a message or instruction (e.g., via the IP network 106) to a server maintaining the example user interface 400 thereby, causing the user interface 400 to visually communicate a type of expression to some (e.g., participants that have requested a volume adjustment of the current speaker) or all of the participants in the dedicated voice inflection section 414 of FIG. 4 (block 356). For example, the indicator 416 of FIG. 4 may include text or one or more images conveying that the current speaker is yelling or screaming. Thus, while some listening participants may not audibly receive the intended expression of the current speaker (e.g., due to volume adjustments made according to the preference settings 216), the inflection detector 210 visually informs participants of any inflections in, for example, the tone of the current speaker.

To further implement the behavior-based policy, the queue manager 214 automatically determines the relevancy of the statements and/or questions being made by the current speaker. In response to such a determination, the queue manager 214 adjusts the point total associated with the current speaker according to the behavior-based policy. Specifically, the queue manager 214 compares (e.g., via a speech recognition module implemented by the example processor 501) the contents of the current speaker's speech to one or more keywords associated with the conference call (e.g., in an agenda set by a moderator and stored in memory linked to the queue manager 114) (block 358). If one or more statements are determined to be substantially relevant (e.g., the current speaker used keyword(s) frequently in a predetermined time period) or substantially irrelevant (e.g., the current speaker used keyword(s) infrequently, if any, of keywords were detected over a predetermined period of time), the point total associated with the current speaker is adjusted accordingly (block 360). In particular, the queue manager 214 increments the point total associated with the current speaker in response to detecting a substantially relevant statement or question, and the queue manager 214 decrements the point total associated with the current speaker in response to detecting a substantially irrelevant statement or question.

Further, the queue manager 214 can receive feedback from listening participants (e.g., participants other than the current speaker) regarding the relevancy of the statements being made or the questions being asked by the current speaker. In the illustrated example, participants input feedback via the web-based user interface 400 of FIG. 4, which conveys received feedback to the queue manager 214 (e.g., via the IP network 106). In particular, the example user interface 400 of FIG. 4 includes soft-key(s) (e.g., images of button(s)), such as relevancy key(s) 420, disposed on the HTML page associated with the conference call. If a participant feels that the current speaker is on-point (e.g., by asking relevant, productive, or useful questions), the participant may engage a high relevancy key 422. If a participant feels that the current speaker is off-point (e.g., wasting time by asking irrelevant questions), the participant may engage a low relevancy key 424. In the illustrated example of FIG. 3A, such an engagement of the relevancy key(s) 420 is referring to as a vote. In other words, the engaging participant is voting to reduce the point total associated with the current speaker that determines queue positioning. If a vote is received (block 362), the queue manager 214 adjusts the point total associated with the current speaker (block 364). In alternative examples, a predetermined threshold amount of votes must be received before the queue manager 214 adjusts the point total associated with the current speaker. Preferably, the voting is anonymous to enable participants to frankly rate the relevancy of the current speaker without fear of reprisals.

The processes described above continue until the current speaker is done speaking (block 366). When the current speaker is done speaking, as indicated, for example, by the absence of incoming audio for a predetermined duration of time (e.g., one second) the queue manager 214 determines whether a duration that the current speaker held the floor (e.g., continuously spoke) exceeds a predetermined threshold (block 368). The predetermined threshold is set (e.g., by a moderator) such that exceeding the threshold indicates that the current speaker held the floor for a relatively long period of time compared to an average duration of speaking. Thus, in response to the current speaker exceeding the predetermined threshold duration, the queue manager 214 decrements the point total associated with the current speaker according to the behavior-based policy (block 370). In the illustrated example of FIG. 3A, the duration is tracked by the queue manager 214. In alternative examples, the current speaker identifier 204, the participant recorder 202, or any other suitable component of the example conference call manager 102 of FIG. 2 may track the duration of the current speaker's speaking session.

Then, the interrupt handler 206 of FIG. 2 reviews the queue 212 for blocked participants (block 372). If the queue 212 includes an identifier of a participant, then the participant next in the queue 212 is unblocked and the interrupt handler 206 of FIG. 2 causes the indicator 408 of FIG. 4 to convey that information to the unblocked participant (block 374). In the illustrated example of FIG. 3A, the participant in the first position of the queue 212 (e.g., with highest point total according to the behavior-based policy) is unblocked and enabled to contribute to the conference call. Alternatively, the queue manager 214 may manage and/or organize the queue 212 according to other policies, such as FIFO, LIFO, by priority ranking, etc. Further, the indication 408 displayed to the unblocked participant(s) may be an image, text (e.g., "You have the floor"), or a combination thereof. The processes described above in FIGS. 3A-C may continue until, for example, a moderator has ended the conference call or no participants remain.

Figure 5:
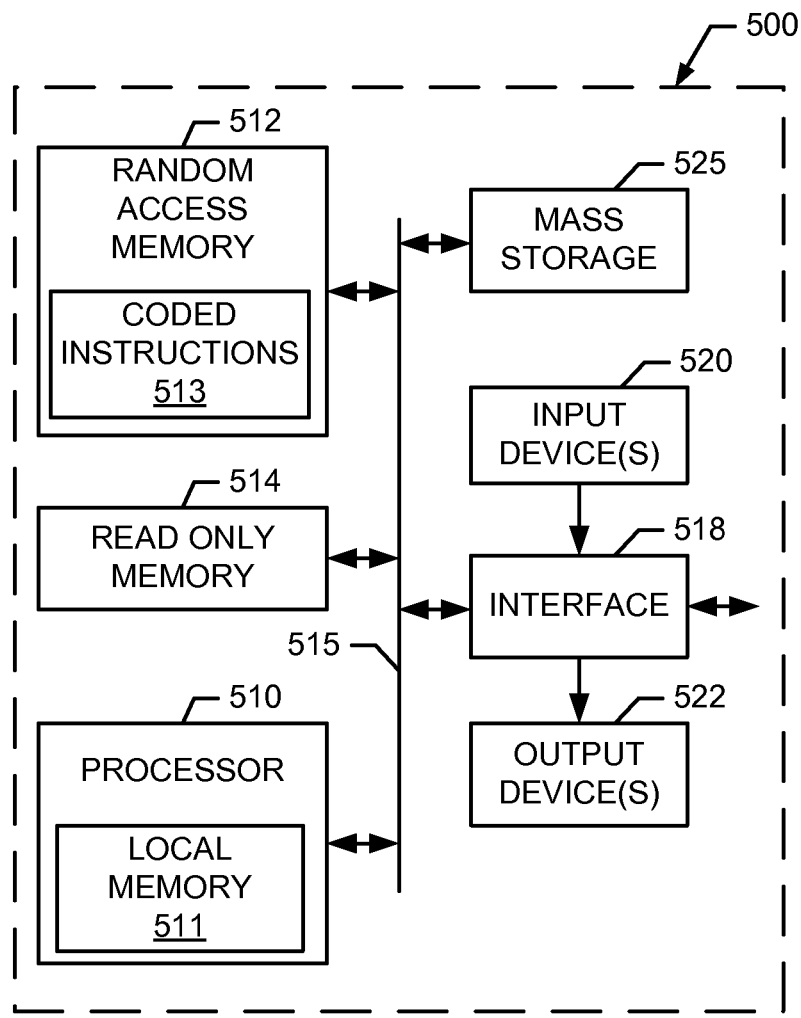
FIG. 5 is a schematic illustration of an example processor platform which may execute the example machine readable instructions of FIGS. 3A, 3B, and/or 3C to implement the example system of FIG. 1.

FIG. 5 is a block diagram of an example processor platform 500 capable of executing the machine readable instructions represented by FIGS. 3A-C to implement the apparatus and/or methods disclosed herein. The processor platform 500 can be, for example, a server, a personal computer, a laptop, a PDA, or any other type of computing device.

The processor platform 500 of the instant example includes a processor 510 such as a general purpose programmable processor. The processor 510 includes a local memory 511, and executes coded instructions 513 present in the local memory 511 and/or in another memory device. The processor 510 may execute, among other things, the example process illustrated in FIGS. 3A-C. The processor 510 may be any type of processing unit, such as a microprocessor from the Intel® Centrino® family of microprocessors, the Intel® Pentium® family of microprocessors, the Intel® Itanium® family of microprocessors, the Intel XScale® family of processors, and/or the Motorola® family of processors. Of course, other processors from other families are also appropriate.

The processor 510 is in communication with a main memory including a volatile memory 512 and a non-volatile memory 514 via a bus 516. The volatile memory 512 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 514 may be implemented by flash memory and/or any other desired type of memory device. Access to the main memory 512, 514 is typically controlled by a memory controller (not shown).

The processor platform 500 also includes an interface circuit 518. The interface circuit 518 may be implemented by any type of interface standard, such as an Ethernet interface, a universal serial bus (USB), and/or a third generation input/output (3GIO) interface.

One or more input devices 520 are connected to the interface circuit 518. The input device(s) 520 permit a user to enter data and commands into the processor 510. The input device(s) can be implemented by, for example, a keyboard, a mouse, a touchscreen, a track-pad, a trackball, isopoint and/or a voice recognition system.

One or more output devices 522 are also connected to the interface circuit 518. The output devices 522 can be implemented, for example, by display devices (e.g., a liquid crystal display, a cathode ray tube display (CRT), a printer and/or speakers). The interface circuit 518 may, thus, typically include a graphics driver card.

The interface circuit 518 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processor platform 500 also includes one or more mass storage devices 526 for storing software and data. Examples of such mass storage devices 526 include floppy disk drives, hard drive disks, compact disk drives and digital versatile disk (DVD) drives. The mass storage device 526, for example, may implement the example databases described above.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HTML, HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

This patent contemplates examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example software or firmware executed on hardware and/or stored in a memory, it should be noted that such software or firmware is merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods and articles of manufacture, persons of ordinary skill in the art will readily appreciate that the examples are not the only way to implement such methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
   identifying a current speaker of a conference call;
   enabling, via a logic circuit, a participant in the conference call, other than the current speaker, to request an adjustment of a volume of the current speaker, the participant different than the current speaker; and
   in response to a request from the participant, adjusting, via the logic circuit, an amplification setting associated with the current speaker in a preference file associated with the participant.

2. A method as defined in claim 1, wherein the determining of the identity of the current speaker is done from a record identifying the participants of the conference call.

3. A method as defined in claim 2, further including maintaining the record of the participants of the conference call by tracking identification numbers associated with respective participants as the corresponding participant joins the conference call.

4. A method as defined in claim 1, further including conveying an audio signal based on the preference file associated with the participant to a communication device of the participant.

5. A method as defined in claim 1, further including integrating the amplification setting into an aggregate audio signal to be conveyed to the participant.

6. A method as defined in claim 5, wherein the integrating of the amplification setting includes performing a multiplication operation with the amplification setting and the incoming audio signal of the current speaker.

7. A method as defined in claim 1, wherein the participant is a first participant, and the adjusting of the amplification setting does not affect a second one of the participants of the conference call, the second one of the participants different from the participant.

8. A method as defined in claim 1, wherein the request from the participant is received via a web page having an input associated with the amplification setting of the current speaker.

9. A method as defined in claim 1, further including storing the amplification setting associated with the current speaker in the preference file for future conference calls.

10. A method as defined in claim 1, further including sensing an inflection in a voice of the current speaker and visually conveying the inflection to the participant of the conference call.

11. A method as defined in claim 1, further including enabling the one other participant to adjust a universal amplification setting associated with the conference call.

12. A tangible computer readable storage device including instructions that, when executed, cause a processor to perform operations comprising:
   identify a current speaker of a conference call;
   enable a participant of the conference call to request an adjustment of a volume of the current speaker, the participant different than the current speaker; and
   in response to a request from the other participant, adjusting an amplification setting associated with the current speaker in a preference file associated with the participant.

13. The storage device as defined in claim 12, wherein the identifying of the current speaker is done using a record identifying all participants of the conference call.

14. The storage device as defined in claim 12, wherein the operations further include conveying an audio signal based on the preference file associated with the participant to a communication device of the participant.

15. The storage device as defined in claim 12, wherein the participant is a first participant, and the adjusting of the amplification setting does not affect a second participant of the conference call.

16. The storage device as defined in claim 12, wherein the request from the participant is received via a web page having an input associated with the amplification setting of the current speaker.

17. The storage device as defined in claim 12, wherein the operations further include enabling the participant to adjust a universal amplification setting associated with the conference call.

18. An apparatus, comprising:
   memory including machine-readable instructions; and
   a processor to execute the instructions to perform operations including:
      identifying a current speaker of a conference call;
      enabling a participant of the conference call to request an adjustment of a volume of the current speaker, the participant different than the current speaker; and
      in response to a request from participant, adjusting an amplification setting associated with the current speaker in a preference file associated with the participant.

19. An apparatus as defined in claim 18, wherein the identifying of the identity of the current speaker is done from a record of the participants of the conference call.

20. An apparatus as defined in claim 18, wherein the participant is a first participant, and the adjusting of the amplification setting does not affect a second participant of the conference call.

* * * * *